(12) United States Patent
Okuno et al.

(10) Patent No.: US 12,393,872 B2
(45) Date of Patent: Aug. 19, 2025

(54) MACHINE LEARNING DEVICE, METHOD, PROGRAM, AND SYSTEM

(71) Applicant: SHOWA DENKO K.K., Tokyo (JP)

(72) Inventors: Yoshishige Okuno, Tokyo (JP); Eriko Takeda, Tokyo (JP); Junichi Shibuya, Tokyo (JP); Yuki Nakao, Tokyo (JP); Kenji Ogawa, Tokyo (JP)

(73) Assignee: RESONAC CORPORATION, Tokyo (JP)

( * ) Notice: Subject to any disclaimer, the term of this patent is extended or adjusted under 35 U.S.C. 154(b) by 742 days.

(21) Appl. No.: 17/756,002

(22) PCT Filed: Nov. 12, 2020

(86) PCT No.: PCT/JP2020/042269
§ 371 (c)(1),
(2) Date: May 13, 2022

(87) PCT Pub. No.: WO2021/100606
PCT Pub. Date: May 27, 2021

(65) Prior Publication Data
US 2022/0391759 A1    Dec. 8, 2022

(30) Foreign Application Priority Data

Nov. 19, 2019    (JP) .................................. 2019-208576

(51) Int. Cl.
*G06N 20/00* (2019.01)

(52) U.S. Cl.
CPC .................................. *G06N 20/00* (2019.01)

(58) Field of Classification Search
None
See application file for complete search history.

(56) References Cited

U.S. PATENT DOCUMENTS

| | | | |
|---|---|---|---|
| 2011/0085739 A1* | 4/2011 | Zhang | G06F 16/58 382/218 |
| 2018/0181885 A1* | 6/2018 | Higo | G06N 20/20 |

(Continued)

FOREIGN PATENT DOCUMENTS

| | | |
|---|---|---|
| CN | 104751198 | 7/2015 |
| CN | 105354600 | 2/2016 |

(Continued)

OTHER PUBLICATIONS

International Search Report mailed on Feb. 16, 2021 with respect to PCT/JP2020/042269.

*Primary Examiner* — Xuyang Xia
(74) *Attorney, Agent, or Firm* — IPUSA, PLLC

(57) ABSTRACT

The present invention is designed to improve the accuracy of machine learning. The present invention provides: a first classification unit configured to classify data into classifiable data and initially-unclassifiable data based on a first learning model; a first annotation unit configured to annotate the classifiable data with a label; a second classification unit configured to classify the initially-unclassifiable data based on a second learning model; a label acquiring unit configured to acquire a label with which the initially-unclassifiable data is to be annotated; a second annotation unit configured to annotate the initially-unclassifiable data with a label; and a second learning model updating unit configured to update the second learning model based on the initially-unclassifiable data that is annotated with the label based on a result of classification by the second classification unit and the label acquired by the label acquiring unit.

7 Claims, 9 Drawing Sheets

(56) References Cited

U.S. PATENT DOCUMENTS

| | | | |
|---|---|---|---|
| 2018/0307946 A1 | 10/2018 | Kuroda et al. | |
| 2019/0228527 A1* | 7/2019 | Ramirez | G16H 30/40 |
| 2019/0370613 A1* | 12/2019 | Arngren | G06N 20/10 |
| 2020/0167689 A1* | 5/2020 | Pojman | G06V 20/176 |

FOREIGN PATENT DOCUMENTS

| | | |
|---|---|---|
| CN | 105654944 | 6/2016 |
| CN | 105981371 | 9/2016 |
| CN | 107273919 | 10/2017 |
| CN | 107403198 | 11/2017 |
| CN | 107924491 | 4/2018 |
| CN | 108470170 | 8/2018 |
| CN | 109446302 | 3/2019 |
| CN | 110046636 | 7/2019 |
| CN | 110325998 | 10/2019 |
| JP | 2018-018537 | 2/2018 |
| JP | 2019-152948 | 9/2019 |
| JP | 2019-529882 | 10/2019 |
| WO | 2018/153469 | 8/2018 |

* cited by examiner

FIG.5
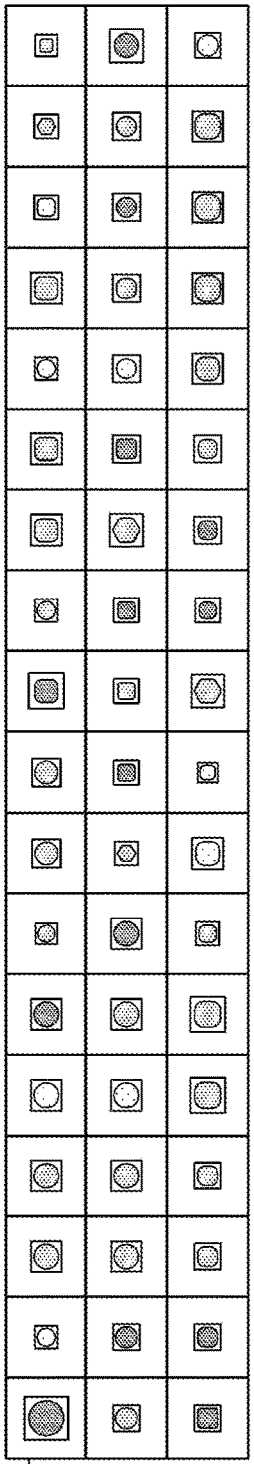
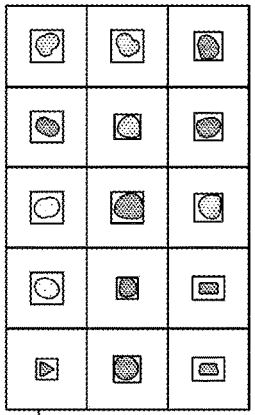
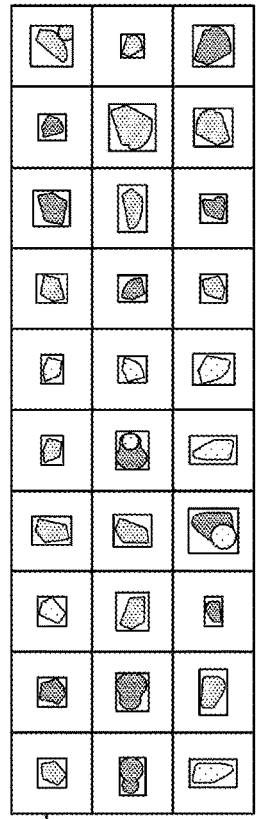
500 PARTICLE IMAGE
501 CLASSIFIABLE DATA (OK PARTICLE IMAGE)
502 INITIALLY-UN-CLASSIFIABLE DATA
503 CLASSIFIABLE DATA (NG PARTICLE IMAGE)

MACHINE LEARNING DEVICE, METHOD, PROGRAM, AND SYSTEM

TECHNICAL FIELD

This application is based upon and claims priority to Japanese patent application No. 2019-208576, filed on Nov. 19, 2019, the entire contents of which are incorporated herein by reference.

The present invention relates to a machine learning device, a method, a program, and a system.

BACKGROUND ART

Conventionally, a large amount of training data has been used in supervised learning in machine learning. For example, persons who may also be called data scientists create training data by annotating data with labels (hereinafter also referred to as "annotation"), and perform machine learning by using these training data, thereby generating a learning model. Since inadequate training data reduces the accuracy of a learning model, it is desirable to create adequate training data.

In classification, which is one technique used in machine learning, input data is classified into two classes (also referred to as "binary classification," "2-class classification," etc.), or into three or more classes (also referred to as "multi-class classification"). The data for creating training data in such classification includes data to which the labels to be applied can be determined with a high level of confidence, and data to which the labels to be applied can be determined only with a low level of confidence.

For example, in patent document 1, a training data creating device creates training data by acquiring either one of a positive evaluation, a negative evaluation, and an ignorable evaluation, per label, as each individual label's evaluation. Then, the learning device adjusts the weight coefficient of an intermediate layer so that the recognition score of labels that are evaluated positive or negative, and the accuracy score of positive evaluations or negative evaluations, come close to each other, and the recognition score of labels that are evaluated ignorable does not affect the adjustment of the intermediate layer's weight coefficient (see, for example, paragraph[0010] of Patent Document 1).

CITATION LIST

Patent Document

[Patent Document 1] Japanese Unexamined Patent Application Publication No. 2018-18537

SUMMARY OF THE INVENTION

Problem to be Solved by the Invention

However, in Patent Document 1, the operation of assigning evaluations to all labels needs to be performed by an annotator, who is a person, and it takes a lot of manpower to create a large amount of training data. Therefore, according to patent document 1, it is difficult to improve the accuracy of machine learning.

It is therefore an object of one embodiment of the present invention to improve the accuracy of machine learning.

Means to Solve the Problem

The present invention may be configured as follows:
[1] A machine learning device comprising:
a first classification unit configured to classify data into classifiable data and initially-unclassifiable data based on a first learning model;
a first annotation unit configured to annotate the classifiable data with a label;
a second classification unit configured to classify the initially-unclassifiable data based on a second learning model;
a label acquiring unit configured to acquire a label with which the initially-unclassifiable data is to be annotated;
a second annotation unit configured to annotate the initially-unclassifiable data with a label; and
a second learning model updating unit configured to update the second learning model based on the initially-unclassifiable data that is annotated with the label based on a result of classification by the second classification unit and the label acquired by the label acquiring unit.

[2] The machine learning device according to [1], further comprising a first learning model updating unit configured to update the first learning model based on the initially-unclassifiable data, annotated with the label based at least on the result of classification by the second classification unit.

[3] The machine learning device according to [1] or [2], wherein the labels are for classifying the data into two classes.

[4] The machine learning device according to any one of [1] to [3],
wherein the data includes images of particles, and
wherein the label is one of:
a label indicating that a shape of a particle included in the images of particles satisfies a predetermined criterion; and
a label indicating that the shape of the particle does not satisfy the predetermined criterion.

[5] The machine learning device according to any one of [1] to [4], wherein the label acquiring unit acquires only the label with which the initially-unclassifiable data identified in the second classification unit is to be annotated, the initially-unclassifiable data having a lower level of confidence of being an OK particle image than a predetermined value, and having a lower level of confidence of being an NG particle image than a predetermined value.

[6] The machine learning device according to any one of [1] to [5],
wherein the data includes images of all particles in a target-object image, and
wherein the first annotation unit reports a proportion of OK particle images with respect to the entirety of the images of particles, a proportion of NG particle images with respect to the entirety of the images of particles, and a proportion of the initially-unclassifiable data with respect to the entirety of the images of particles.

[7] A method comprising:
classifying data into classifiable data and initially-unclassifiable data based on a first learning model;
annotating the classifiable data with a label;
classifying the initially-unclassifiable data based on a second learning model;
acquiring a label with which the initially-unclassifiable data is to be annotated;
annotating the initially-unclassifiable data with a label; and
updating the second learning model based on the initially-unclassifiable data that is annotated with the label based on a result of classification of the initially-unclassifiable data and the label with which the initially-unclassifiable data is to be annotated.

[8] A program that makes a computer function as:
a first classification unit configured to classify data into classifiable data and initially-unclassifiable data based on a first learning model;
a first annotation unit configured to annotate the classifiable data with a label;
a second classification unit configured to classify the initially-unclassifiable data based on a second learning model;
a label acquiring unit configured to acquire a label with which the initially-unclassifiable data is to be annotated;
a second annotation unit configured to annotate the initially-unclassifiable data with a label; and
a second learning model updating unit configured to update the second learning model based on the initially-unclassifiable data that is annotated with the label based on a result of classification by the second classification unit and the label acquired by the label acquiring unit.

[9] A system comprising a machine learning device and a user terminal, the system comprising:
a first classification unit configured to classify data into classifiable data and initially-unclassifiable data based on a first learning model;
a first annotation unit configured to annotate the classifiable data with a label;
a second classification unit configured to classify the initially-unclassifiable data based on a second learning model;
a label acquiring unit configured to acquire a label with which the initially-unclassifiable data is to be annotated;
a second annotation unit configured to annotate the initially-unclassifiable data with a label; and
a second learning model updating unit configured to update the second learning model based on the initially-unclassifiable data that is annotated with the label based on a result of classification by the second classification unit and the label acquired by the label acquiring unit Advantageous Effects of Invention According to the embodiments of the present invention, the accuracy of machine learning can be improved.

BRIEF DESCRIPTION OF DRAWINGS

FIG. 5 illustrates example particle images stored in a Particle image storage unit according to the embodiment of the present invention.

DESCRIPTION OF EMBODIMENTS

Now, embodiments of the present invention will be described below with reference to the accompanying drawings. Note that, in the present specification and the accompanying drawings, components that have substantially the same functional structures will be assigned the same reference signs, and redundant description will be omitted.

Note that, although this specification will describe cases in which image data is used as training data, the present invention is equally applicable to cases in which any data of choice is used, including text data, voice/sound data, and so forth.

Also, although this specification will describe cases in which particle images of aluminum oxide particles contained in aluminum oxide powder and the like are used as training data, the present invention is equally applicable to cases in which particle images of any substance of choice are used. Also, although this specification will describe cases in which data (particle images) is classified into two classes (also referred to as "binary classification," "two-class classification," etc.), the present invention is equally applicable to cases in which data (particle images) is classified into three or more classes (also referred to as "multi-class classification"). Also, although this specification will describe cases in which images obtained through an optical microscope are used as training data, the present invention is equally applicable to cases in which images obtained by using any device of choice other than optical microscopes such as a scanning electron microscope (SEM) are used.

Now, embodiments to create training data (Embodiment 1 and Embodiment 2 below) and an embodiment to infer input data classification results (Embodiment 3 below) will be described separately.

Embodiment 1

<System Structure>

Figure 1:
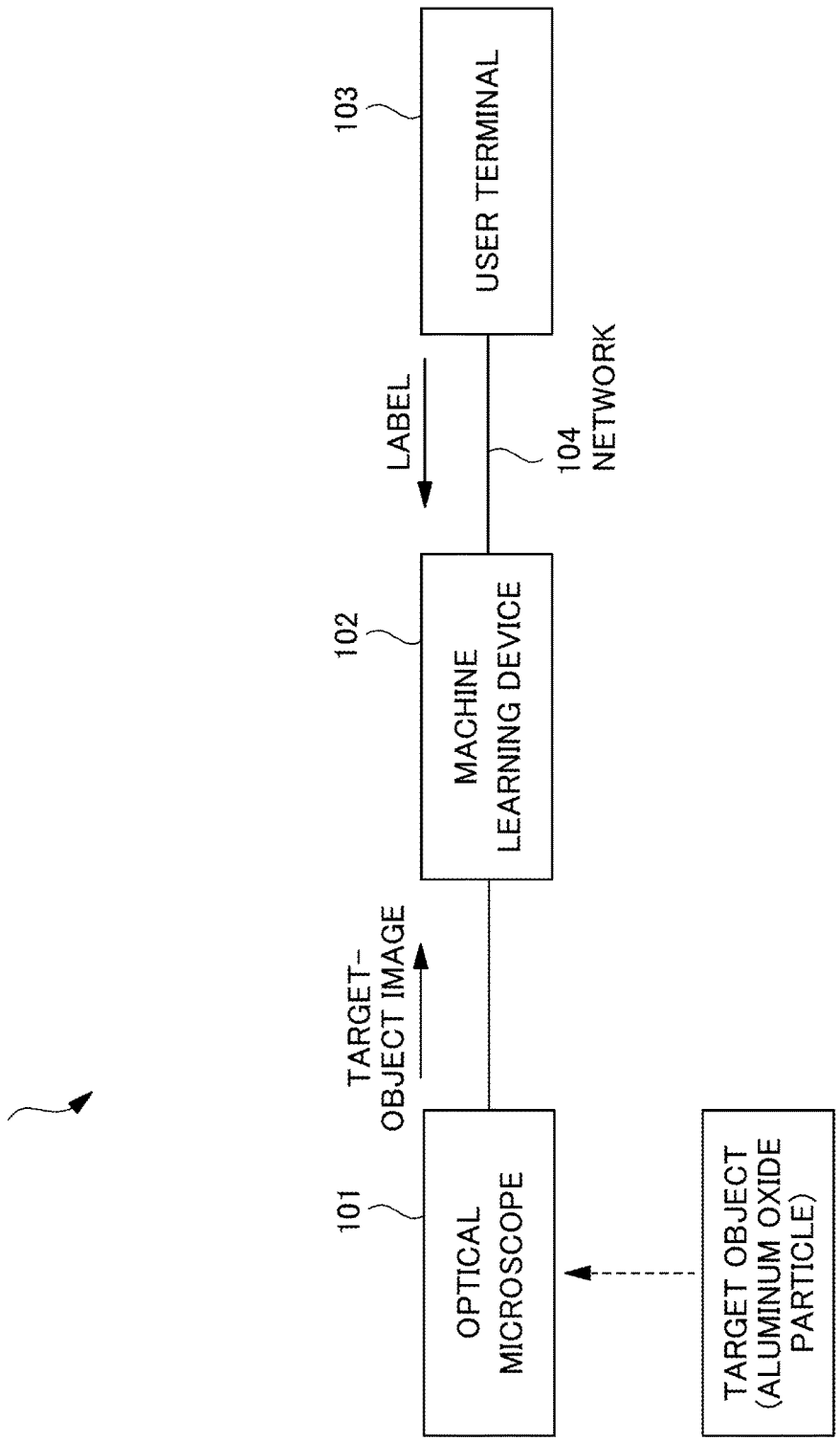
FIG. 1 is a diagram that illustrates an overall system structure including a machine learning device according to an embodiment of the present invention.

FIG. 1 is a diagram that illustrates an overall system structure including a machine learning device 102 according to an embodiment of the present invention. The machine learning device 102 can be used in a system for performing a quality check (quality check system 100). The quality check system 100 can include an optical microscope 101, a machine learning device 102, and a user terminal 103. The machine learning device 102 acquires the images captured by the optical microscope 101 connected with the machine learning device 102, from the optical microscope 101. Also, the machine learning device 102 sends and receives data to and from the user terminal 103 via an unspecified network 104. Note that, when the machine learning device 102 transmits and receives data to and from the optical microscope 101 or the user terminal 103, this may be done via a memory medium such as a semiconductor memory described later. Now, each component will be described below.

The optical microscope 101 captures an image of a target object (for example, aluminum oxide particles contained in aluminum oxide powder or the like). The optical microscope 101 can include an image capturing device such as a digital camera, and a storage device for storing the captured images of the target object. Also, the optical microscope 101 can send the captured images of the target object to the machine learning device 102 connected to the optical microscope 101. The microscope included in the optical microscope 101 may be a reflection-type microscope or a transmission-type microscope. Also, the optical microscope 101 may have a light source such as an ultra-high-pressure mercury lamp, a xenon lamp, color LEDs including the three primary colors, ultraviolet LEDs, a laser beam, and so forth. Also, as for the method of observing images, observation methods such as the bright field observation method, the dark field observation method, the phase contrast observation method, the differential interference contrast observation method, the polarization observation method, and the fluorescence observation method can be used.

The machine learning device 102 is a device that creates training data by annotating data with labels (hereinafter also referred to as "annotation"). To be more specific, the machine learning device 102 classifies data into classifiable data and initially-unclassifiable data based on a first learning model. Also, the machine learning device 102 classifies the initially-unclassifiable data based on a second learning model. Furthermore, the machine learning device 102 updates the second learning model by reflecting the corrections from the user terminal 103. The machine learning device 102 is composed of, for example, one or more computers. Later herein, the machine learning device 102 will be described in detail with reference to FIG. 3.

The user terminal 103 is a terminal that is used by the person who corrects the classification made by the machine learning device 102 based on the second learning model. To be more specific, the user terminal 103 receives initially-unclassifiable data from the machine learning device 102, and displays this on the user terminal 103 or on a display device (not shown) that is connected to the user terminal 103. Also, the user terminal 103 transmits the data of the labels input to the user terminal 103, to the machine learning device 102. The user terminal 103 may be, for example, a computer such as a personal computer.

Note that, although the machine learning device 102 and the user terminal 103 will be described as separate computers in the present specification, the machine learning device 102 and the user terminal 103 may be implemented as a single computer. Also, the machine learning device 102 may have some of the user terminal 103's functions. The user terminal 103 may have some of the machine learning device 102's functions.

<Hardware Structure of the Machine Learning Device 102>

Figure 2:
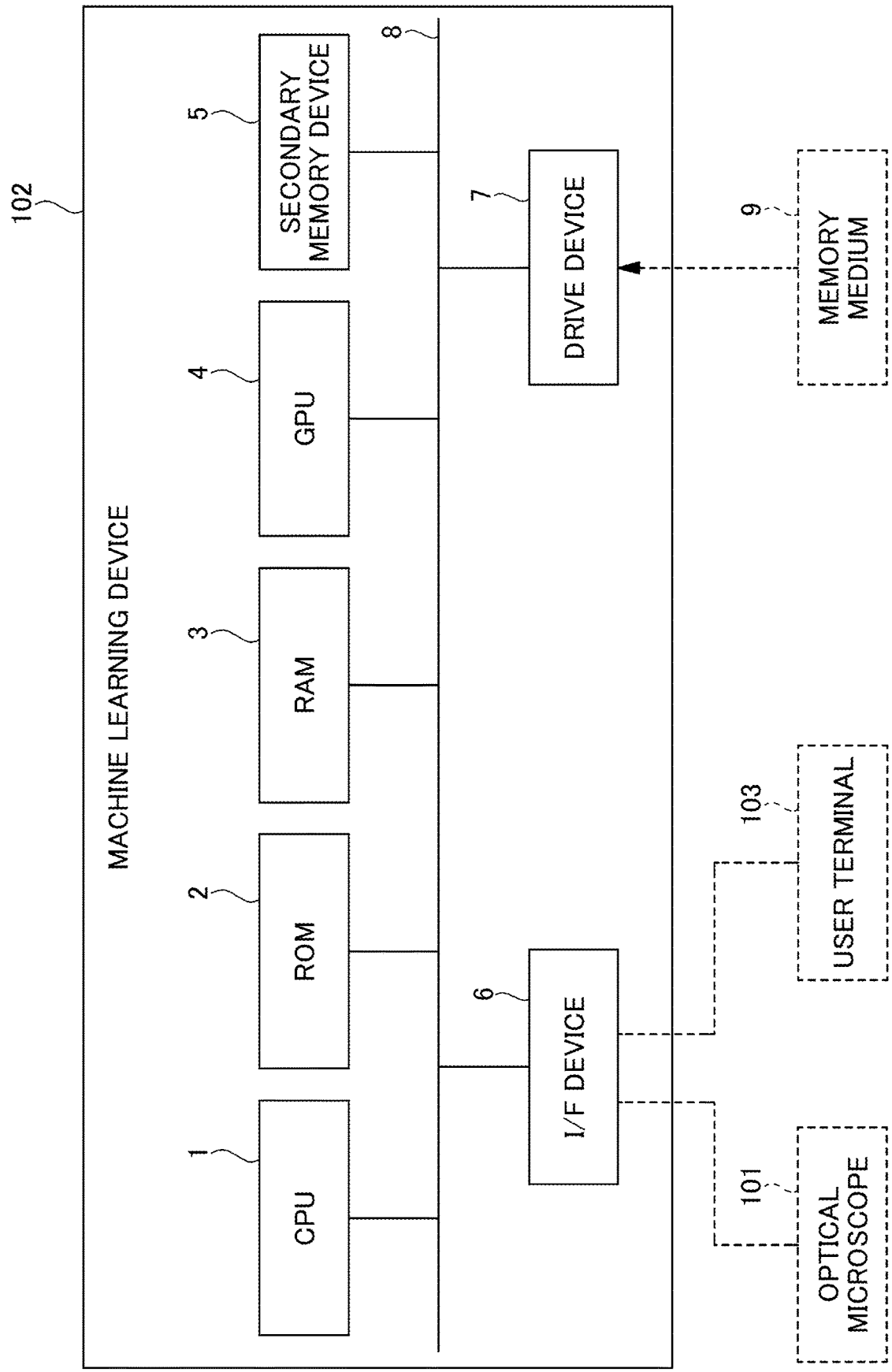
FIG. 2 is a diagram that illustrates a hardware structure of a machine learning device according to an embodiment of the present invention.

FIG. 2 is a diagram that illustrates an example hardware structure of the machine learning device 102 according to an embodiment of the present invention. The machine learning device 102 includes a CPU (Central Processing Unit) 1, a ROM (Read Only Memory) 2, and a RAM (Random Access Memory) 3. The CPU 1, the ROM 2, and the RAM 3 form what is known as a computer.

Also, the machine learning device 102 can further include a GPU (Graphics Processing Unit) 4, a secondary memory device 5, an I/F (Interface) device 6, and a drive device 7. Note that each piece of hardware constituting the machine learning device 102 is connected with one another via a bus 8.

The CPU 1 is an arithmetic logic device for executing a variety of programs installed in the secondary memory device 5.

The ROM 2 is a non-volatile memory. The ROM 2 functions as a main memory device for storing a variety of programs, data, and so forth that the CPU 1 needs when executing a variety of programs installed in the secondary memory device 5. To be more specific, the ROM 2 functions as a main memory device for storing, for example, BIOS (Basic Input/Output System), EFI (Extensible Firmware Interface) and other boot programs.

The RAM 3 is a volatile memory such as a DRAM (Dynamic Random Access Memory), an SRAM (Static Random Access Memory), and the like. The RAM 3 functions as a main memory device that provides a work field that is expanded when a variety of programs installed in the secondary memory device 5 are executed on the CPU 1.

The GPU 4 is an arithmetic logic device specialized in image processing.

The secondary memory device 5 is a secondary memory device that stores a variety of programs and information for use when executing a variety of programs.

The I/F device 6 is a communication device for communicating with the optical microscope 101 and the user terminal 103.

The drive device 7 is a device for setting up a memory medium 9. The memory medium 9 here includes a medium to record information optically, electrically, or magnetically, such as a CD-ROM, a flexible disk, a magneto-optical disk, or the like. Also, the memory medium 9 may include a semiconductor memory to record information electrically, such as a ROM, a flash memory, or the like.

Note that, as for the method of installing a variety of programs in the secondary memory device 5, these programs may be installed as a distributed memory medium 9 is set in the drive device 7, and a variety of programs recorded in the memory medium 9 are read by the drive device 7. Alternatively, a variety of programs may be installed in the secondary memory device 5 by being downloaded from the network via the I/F device 6.

<Functional Blocks of the Machine Learning Device 102>

Figure 3:
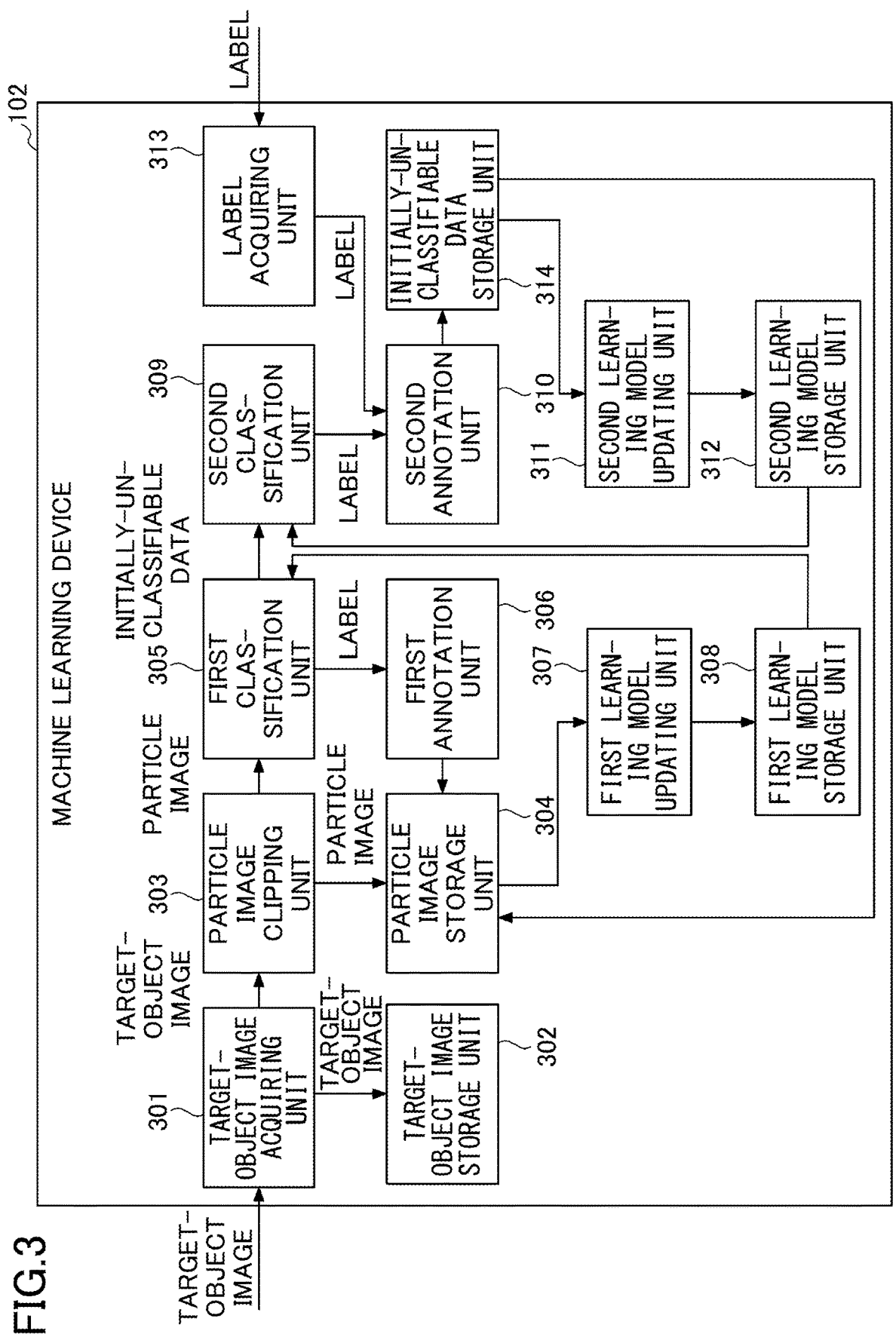
FIG. 3 is a diagram that illustrates the functional blocks of a machine learning device according to an embodiment of the present invention.

FIG. 3 is a diagram that illustrates the functional blocks of the machine learning device 102 according to an embodiment of the present invention. The machine learning device 102 includes a target-object image acquiring unit 301, a target-object image storage unit 302, a particle image clipping unit 303, a particle image storage unit 304, a first classification unit 305, a first annotation unit 306, a first learning model storage unit 308, a second classification unit 309, a second annotation unit 310, a second learning model updating unit 311, a second learning model storage unit 312, a label acquiring unit 313, and an initially-unclassifiable data storage unit 314. The machine learning device 102 can further include a first learning model updating unit 307. Also, by executing programs, the machine learning device 102 functions as the target-object image acquiring unit 301, the particle image clipping unit 303, the first classification unit 305, the first annotation unit 306, the second classification unit 309, the second annotation unit 310, the second learning model updating unit 311, and the label acquiring unit 313. Furthermore, by executing programs, the machine learning device 102 can also function as the first learning model updating unit 307. Each component will be described below.

The target-object image acquiring unit 301 acquires the images of target objects captured by the optical microscope 101 or the like. Also, the target-object image acquiring unit 301 stores the acquired images of target objects in the target-object image storage unit 302.

The target-object image storage unit 302 stores the target-object images acquired by the target-object image acquiring unit 301. Now, the target-object images stored in the target-object image storage unit 302 will be described below with reference to FIG. 4.

Figure 4:
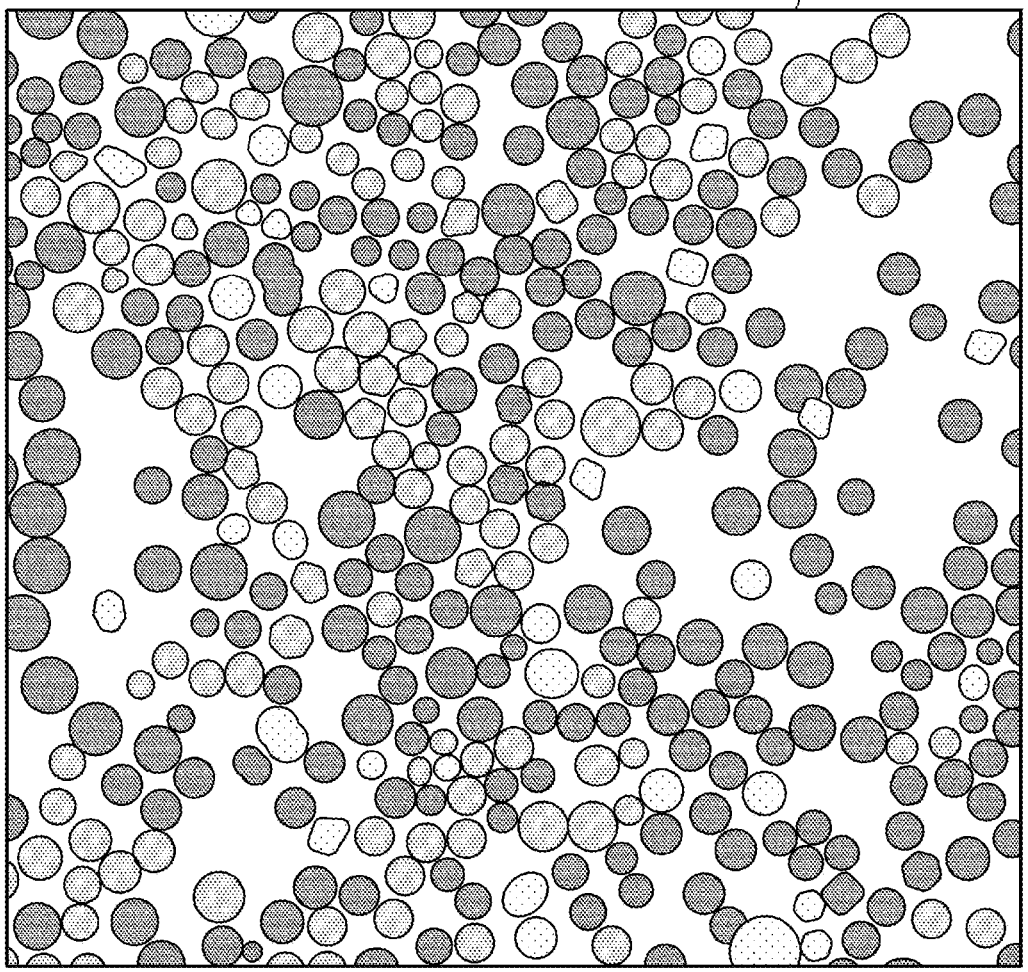
FIG. 4 illustrates an example target-object image stored in a target-object image storage unit according to an embodiment of the present invention.

FIG. 4 shows an example target-object image 400 stored in the target-object image storage unit 302 according to an embodiment of the present invention. The target-object image 400 is, for example, an image in which aluminum oxide particles contained in aluminum oxide powder or the like are captured. As shown in FIG. 4, the target-object image 400 has multiple particles captured therein.

Returning to the description of FIG. 3, the particle image clipping unit 303 clips the images of particles from a target-object image stored in the target-object image storage unit 302. Also, the particle image clipping unit 303 stores these clipped images of particles in the particle image storage unit 304.

The particle image clipping unit 303, for example, binarizes a target-object image and generates a mask image. Also, the particle image clipping unit 303 clips (also referred to as "cropping," "cutting," etc.) the images of each individual particle having no other particles around it, from the target-object image, based on the mask image.

Note that, according to an embodiment of the present invention, as will be described below, the images of particles (hereinafter referred to as "particle images") included in a target-object image are used as data for creating training data. That is, training data is created by annotating particle images with labels. Also, although the following description will illustrate cases in which data (particle images) is classified into two classes, namely acceptable (hereinafter "OK") particle images and unacceptable (hereinafter "NG") particle images (also known as "binary classification," "2-class classification," etc.), the present invention is equally applicable to cases in which data (particle images) is classified into three or more classes (also known as "multi-class classification").

The particle image storage unit 304 stores the particle images clipped by the particle image clipping unit 303. Next, the particle images stored in the particle image storage unit 304 will be described below with reference to FIG. 5.

FIG. 5 illustrates examples of particle images 500 stored in the particle image storage unit 304 according to an embodiment of the present invention. As will be described in detail later herein, the particle images 500 include classifiable data (OK particle images 501 and NG particle images 503), which the first annotation unit 306 can annotate with labels, and initially-unclassifiable data 502, which the first annotation unit 306 cannot annotate with labels.

Now, OK particle images and NG particle images will be described. In the present specification, a particle image, in which the shape of the particle captured therein satisfies a predetermined criterion (hereinafter referred to as an "OK particle"), is referred to as an "OK particle image." Also, a particle image, in which the shape of the particle captured therein does not satisfy the predetermined criterion (hereinafter referred to as an "NG particle"), is referred to as an "NG particle image."

For example, an OK particle image is an image capturing a particle with a roundness that is greater than or equal to a threshold. Here, "roundness" means, in accordance with the definition provided in JIS B0621-1984 "Definitions and Designations of Geometrical Deviations," "the magnitude of deviation from a geometrically perfect circle of a circular shape." For example, an NG particle image is an image in which a particle with a roundness below a threshold is captured. Note that the criterion that the shape of a particle should satisfy is by no means limited to roundness. The present invention is also applicable to cases in which particles have, for example, an elliptical shape and other shapes, and the criterion may be also composed of a set of features such as the area of the particle, lengths of the particle such as the major axis diameter, the minor axis diameter, the circle-equivalent diameter, the ferret diameter, the peripheral length of the particle, and so forth.

Returning to the description of FIG. 3, the first classification unit 305 classifies data (for example, particle images) into classifiable data (for example, OK particle images and NG particle images, etc.) and initially-unclassifiable data. To be more specific, the first classification unit 305 outputs the confidence that a particle image is an OK particle image and the confidence that the particle image is an NG particle image, based on the first learning model stored in the first learning model storage unit 308. Also, when the confidence that a particle image is an OK particle image is greater than or equal to a predetermined value, the first classification unit 305 classifies the particle image as an OK particle image. Also, when the confidence that a particle image is an NG particle image is greater than or equal to a predetermined value, the first classification unit 305 classifies the particle image as an NG particle image. Also, when a particle image is neither an OK particle image nor an NG particle image (that is, the confidence that the particle image is an OK particle image is below a predetermined value, and the confidence that the particle image is an NG particle image is also below a predetermined value), the first classification unit 305 classifies that particle image as initially-unclassifiable data.

The first learning model storage unit 308 stores the first learning model. The first learning model is a model for classification, generated based on machine learning. For example, when a particle image is input, the first learning model serves as a model for outputting the confidence that the particle image is an OK particle image and the confidence that the particle image is an NG particle image.

The first annotation unit 306 creates training data by annotating the classifiable data (for example, OK particle images, NG particle images, etc.), classified in the first classification unit 305, with labels. To be more specific, for example, the first annotation unit 306 links an OK particle image classified by the first classification unit 305 with a label (that is, a label to indicate that the particle captured in this particle image is an OK particle), and stores these in the particle image storage unit 304. Also, for example, the first annotation unit 306 links an NG particle image classified by the first classification unit 305 with a label (that is, a label to indicate that the particle captured in this particle image is an NG particle), and stores these in the particle image storage unit 304.

Note that the first annotation unit 306 may be configured to link and store each target-object image in the target-object image storage unit 302 with the proportion of OK particle images with respect to the entirety of particle images in the target-object image, the proportion of NG particle images with respect to the entirety of particle images, and the proportion of initially-unclassifiable data with respect to the entirety of particle images. Also, the first annotation unit 306 may be configured to report the proportion of OK particle images with respect to the entirety of particle images in each target object image, the proportion of NG particle images with respect to the entirety of particle images, and the proportion of initially-unclassifiable data with respect to the entirety of particle images, to any terminal of choice such as the user terminal 103.

The first learning model updating unit 307 will be described in Embodiment 2.

The second classification unit 309 classifies the initially-unclassifiable data classified by the first classification unit 305.

The second learning model is stored in the second learning model storage unit 312. The second learning model is a model for classification, generated based on machine learning.

A case in which initially-unclassifiable data is classified into <<OK particle images and NG particle images>> and a case in which initially-unclassifiable data is classified into <<OK particle images, NG particle images, and initially-unclassifiable data>> will be described separately.

<<Classification into OK Particle Images and NG Particle Images>>

The second classification unit 309 classifies initially-unclassifiable data into OK particle images and NG particle images, by using the second learning model stored in the second learning model storage unit 312.

In the event of <<Classification into OK particle images and NG particle images>>, for example, when initially-unclassifiable data is input, the second learning model outputs whether the initially-unclassifiable data is an OK particle image or an NG particle image.

<<Classification into OK Particle Images, NG Particle Images, and Initially-Unclassifiable Data>>

The second classification unit 309 classifies initially-unclassifiable data into OK particle images, NG particle images, and initially-unclassifiable data based on the second learning model stored in the second learning model storage unit 312. To be more specific, the second classification unit 309 outputs the confidence (also referred to as "certainty," "reliability," "probability," etc.) that initially-unclassifiable data is an OK particle image and the confidence that the initially-unclassifiable data is an NG particle image, based on the second learning model. Also, when the confidence that initially-unclassifiable data is an OK particle image is greater than or equal to a predetermined value, the second classification unit 309 classifies that initially-unclassifiable data as an OK particle image. Also, when the confidence that initially-unclassifiable data is an NG particle image is greater than or equal to a predetermined value, the second classification unit 309 classifies that initially-unclassifiable data as an NG particle image. Also, when classifiable data is neither an OK particle image nor an NG particle image (that is, the confidence that the classifiable data is an OK particle image is below a predetermined value, and the confidence that the initially-unclassifiable data is an NG particle image is also below a predetermined value), the second classification unit 309 classifies that initially-unclassifiable data as initially-unclassifiable data.

In the event of <<Classification into OK particle images, NG particle images, and initially-unclassifiable data>>, for example, when initially-unclassifiable data is input, the second learning model outputs the confidence that the initially-unclassifiable data is an OK particle image and the confidence that the initially-unclassifiable data is an NG particle image.

The label acquiring unit 313 acquires the data of the label with which the initially-unclassifiable data is to be annotated. To be more specific, the label acquiring unit 313 transmits initially-unclassifiable data (for example, particle images) to the user terminal 103. Note that the label acquiring unit 313 may be configured to transmit initially-unclassifiable data (for example, particle images) as well as information about the result of classification by the second classification unit 309 (for example, whether the initially-unclassifiable data is an OK particle image or an NG particle image, its confidence, etc.) to the user terminal 103. Also, the label acquiring unit 313 receives the label data input to the user terminal 103, from the user terminal 103. A person who operates the user terminal 103 checks the initially-unclassifiable data visually, and determines what labels the initially-unclassifiable data (for example, particle images) is to be annotated with.

Note that, in the above event of classifying initially-unclassifiable data into <<OK particle images, NG particle images, and initially-unclassifiable data>>, the label acquiring unit 313 may be configured to acquire only the data of the labels to be applied to the initially-unclassifiable data having a lower level of confidence of being an OK particle image than a predetermined value and a lower level of confidence of being an NG particle image than a predetermined value.

The second annotation unit 310, for example, annotates the initially-unclassifiable data with a label based on the result of classification by the second classification unit 309 (for example, whether at least part of the initially-unclassifiable data is an OK particle image or an NG particle image) and the label acquired by the label acquiring unit 313. To be more specific, when the classification result in the second classification unit 309 and the label acquired by the label acquiring unit 313 are the same, the second annotation unit 310 annotates the initially-unclassifiable data with that label. Also, if the result of classification by the second classification unit 309 and the label acquired by the label acquiring unit 313 do not match, the second annotation unit 310 annotates the initially-unclassifiable data with the label acquired by the label acquiring unit 313. Also, the second annotation unit 310 links the initially-unclassifiable data with the label applied thereto, and stores these in the initially-unclassifiable data storage unit 314.

In the initially-unclassifiable data storage unit 314, initially-unclassifiable data and the labels applied thereto by the second annotation unit 310 are linked with each other and stored.

The second learning model updating unit 311 updates the second learning model in the second learning model storage unit 312, based on the initially-unclassifiable data annotated with labels by the second annotation unit 310. To be more specific, the second learning model updating unit 311 updates the second learning model by machine-learning the initially-unclassifiable data, annotated with labels by the second annotation unit 310, as training data.

In this way, according to Embodiment 1, the second learning model for classifying initially-unclassifiable data is updated, so that initially-unclassifiable data can be classified more accurately. Also, in the above event of classifying initially-unclassifiable data into <<OK particle images, NG particle images, and initially-unclassifiable data>>, the label acquiring unit 313 is configured to acquire only the data of the labels to be applied to initially-unclassifiable data having a lower level of confidence of being an OK particle image than a predetermined value and a lower level of confidence of being an NG particle image than a predetermined value. Consequently, the more the second learning model is updated, the higher the learning accuracy of the second learning model improves, and the less unclassifiable data there is, so that the data that a person has to check visually and determine which labels are to be applied is reduced.

Embodiment 2

Hereinafter, Embodiment 2 will be described. Note that the differences from Embodiment 1 will be primarily described below.

In Embodiment 2, the machine learning device 102 includes the first learning model updating unit 307 of FIG. 3. Now, the first learning model updating unit 307 will be described.

The first learning model updating unit 307 updates the first learning model in the first learning model storage unit 308 based on unclassified data that is to be annotated with labels by the second annotation unit 310. Note that the first learning model updating unit 307 may be configured to update the first learning model when commanded to update the first learning model from any terminal of choice such as the user terminal 103.

To be more specific, the first learning model updating unit 307 acquires the initially-unclassifiable data annotated with labels by the second annotation unit 310, and adds the data to the particle image storage unit 304. Also, the first learning model updating unit 307 updates the first learning model by machine-learning the data that has been annotated with labels by the first annotation unit 306 (for example, OK particle images and NG particle images), and the initially-unclassifiable data that has been annotated with labels by the second annotation unit 310, in the particle image storage unit 304, as training data.

<<Automation of Updating of the First Learning Model>>

The first learning model updating unit 307 may be configured to update the first learning model without human intervention. To be more specific, the second annotation unit 310 annotates initially-unclassifiable data with labels based solely on initially-unclassifiable data, the confidence of which for being, for example, an OK particle image is determined by the second classification unit 309 to be greater than or equal to a predetermined value, and initially-unclassifiable data, the confidence of which for being, for example, an NG particle image is determined by the second classification unit 309 to be greater than or equal to a predetermined value (that is, data other than unclassifiable data) (that is, the labels acquired by the label acquiring unit 313 are not used). The first learning model updating unit 307 updates the first learning model by machine-learning the data that has been annotated with labels by the first annotation unit 306 (for example, OK particle images and NG particle images), and the data other than the unclassifiable data that has been annotated with labels by the second annotation unit 310, in the particle image storage unit 304, as training data.

<<Display of Proportion of Initially-Unclassifiable Data>>

As explained in Embodiment 1, the first annotation unit 306 may be configured to link each target-object image in the target-object image storage unit 302 with the proportion of OK particle images with respect to the entirety of particle images in the target-object image, the proportion of NG particle images with respect to the entirety of particle images, and the proportion of initially-unclassifiable data with respect to the entirety of particle images. Also, the first annotation unit 306 may be configured to report, for each target-object image, the proportion of OK particle images with respect to the entirety of particle images in the target-object image, the proportion of NG particle images with respect to the entirety of particle images, and the proportion of initially-unclassifiable data with respect to the entirety of particle images, to any terminal of choice such as the user terminal 103. Therefore, it is possible to indicate, to any terminal of choice, such as the user terminal 103, that the more the first learning model is updated, the less initially-unclassifiable data there is.

Thus, according to Embodiment 2, the first learning model for classifying data (for example, particle images) is updated, so that the data (for example, particle images) can be classified more accurately. Also, given that the more the first learning model is updated, the less initially-unclassifiable data there is, the data that a person has to check visually and determine which labels are to be applied is reduced thereby.

Embodiment 3

Now, Embodiment 3 will be described below. Note that the differences from Embodiment 1 and Embodiment 2 will be primarily described below.

In Embodiment 3, the machine learning device 102 infers the classification result of input data. Hereinafter, classification based only on the first learning model, and classification in two steps based on the first learning model and the second learning model will be described separately.

<<Classification Based Only on the First Learning Model>>

The first classification unit 305 acquires input data (for example, particle images) and classifies the input data into classifiable data (for example, OK particle images, NG particle images, etc.) and initially-unclassifiable data, based on the first learning model in the first learning model storage unit 308. The first classification unit 305 reports the result of classification to any terminal of choice, such as the user terminal 103.

<<Two-Step Classification Based on the First Learning Model and the Second Learning Model>>

The first classification unit 305 acquires input data (for example, particle images) and classifies the input data into classifiable data (for example, OK particle images, NG particle images, etc.) and initially-unclassifiable data, based on the first learning model in the first learning model storage unit 308. The second classification unit 309 classifies the initially-unclassifiable data (for example, into OK particle images and NG particle images). The second classification unit 309 reports the result of classification to any terminal of choice such as the user terminal 103. The classification result to report may be only the result of 2-step classification, or both the result of classification by the first classification unit 305 and the result of classification by the second classification unit 309 may be indicated.

<Data Flow>

Figure 6:
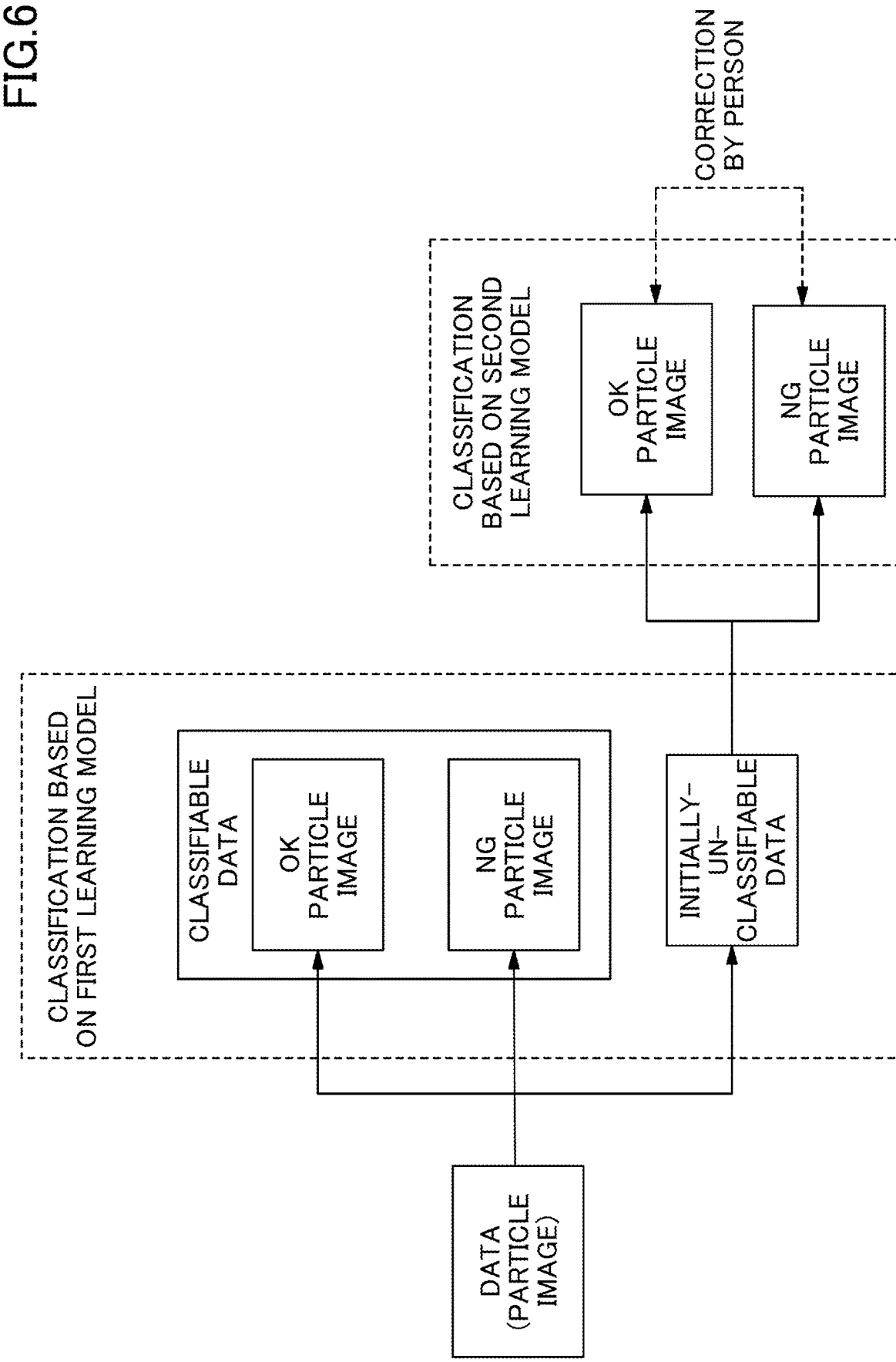
FIG. 6 is a data flow diagram that illustrates a data flow according to an embodiment of the present invention.

FIG. 6 is a data flow diagram that illustrates a data flow according to an embodiment of the present invention. As shown in FIG. 6, data (for example, particle images) is classified into classifiable data (for example, OK particle images, NG particle images, etc.) and initially-unclassifiable data based on the first learning model. After that, the initially-unclassifiable data is classified (for example, into OK particle images and NG particle images) based on the second learning model. Then, the result of classification based on the second learning model is corrected by a person.

<Processing Method>

Hereinafter, each process will be described below with reference to FIG. 7 to FIG. 9.

Figure 7:
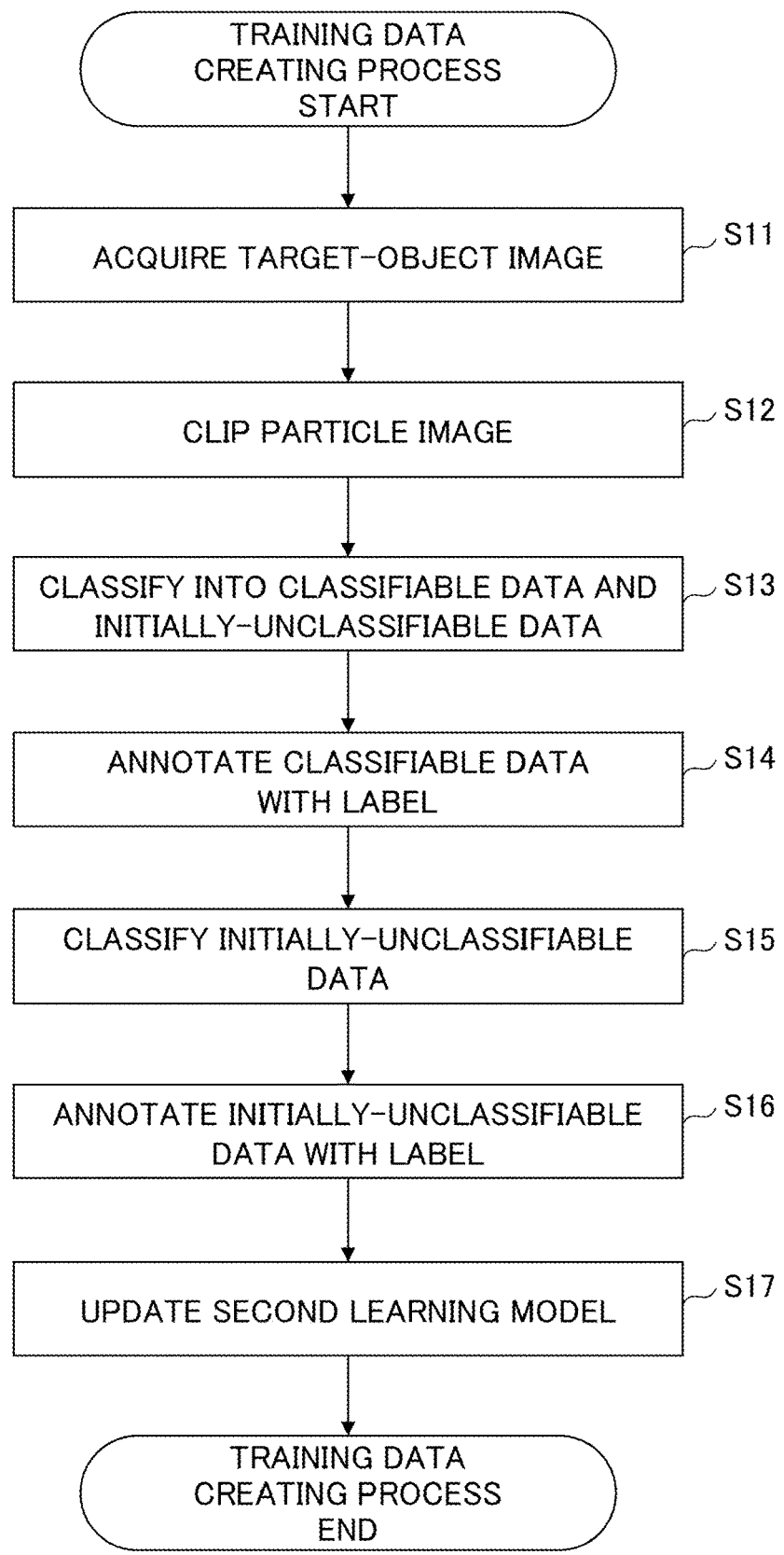
FIG. 7 is a flowchart that illustrates a training data creating process flow according to an embodiment of the present invention.

FIG. 7 is a flowchart that illustrates the flow of the training data creating process according to an embodiment of the present invention.

In step 11 (S11), the target-object image acquiring unit 301 acquires a target-object image captured by the optical microscope 101 or the like.

In step 12 (S12), the particle image clipping unit 303 clips the particle images from the target-object image acquired in S11.

In step 13 (S13), the first classification unit 305 classifies the data (for example, the particle images clipped in S12) into classifiable data (for example, OK particle images, NG particle images, etc.) and initially-unclassifiable data.

In step 14 (S14), the first annotation unit 306 creates training data by annotating the classifiable data classified in S13 (for example, OK particle images, NG particle images, etc.) with labels.

In step 15 (S15), the second classification unit 309 classifies the initially-unclassifiable data identified in S13.

In step 16 (S16), the second annotation unit 310 annotates the initially-unclassifiable data with labels based on the result of classification in S15 (indicating, for example, whether the initially-unclassifiable data includes OK particle images or NG particle images), and the labels acquired by the label acquiring unit 313.

In step 17 (S17), the second learning model updating unit 311 updates the second learning model in the second learning model storage unit 312 based on the initially-unclassifiable data annotated with labels in S16.

Figure 8:
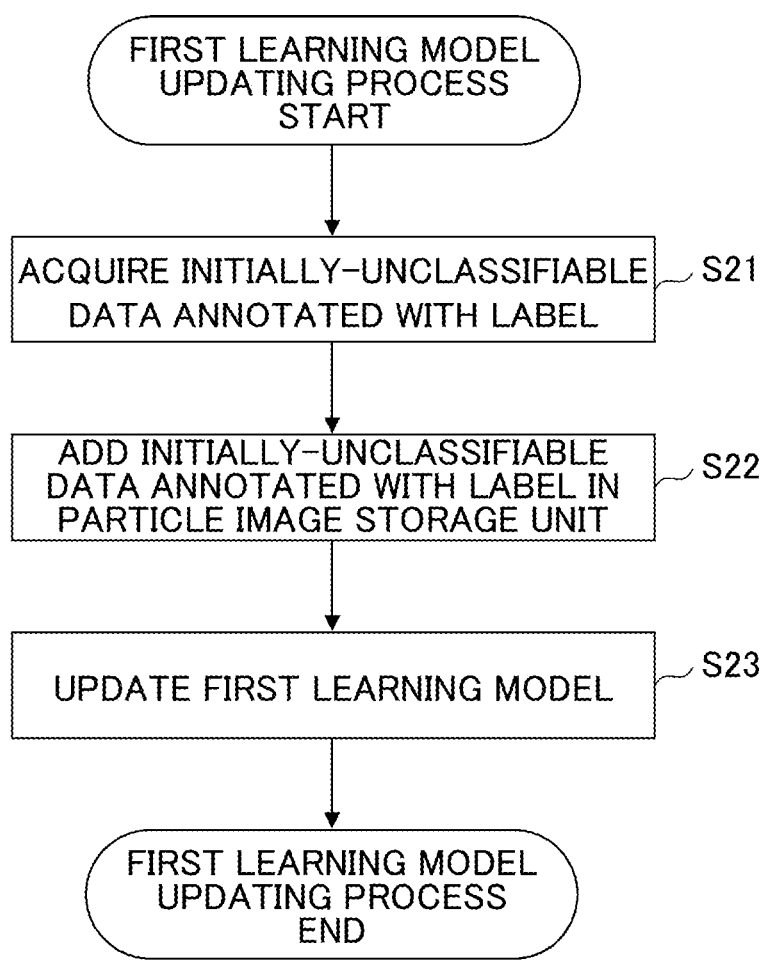
FIG. 8 is a flowchart that illustrates a first learning model updating process flow according to an embodiment of the present invention.

FIG. 8 is a flowchart that illustrates the flow of the first learning model updating process according to an embodiment of the present invention.

In step 21 (S21), the first learning model updating unit 307 acquires the initially-unclassifiable data annotated with labels by the second annotation unit 310.

In step 22 (S22), the first learning model updating unit 307 adds the initially-unclassifiable data acquired in S21, to the particle image storage unit 304.

In step 23 (S23), the first learning model updating unit 307 updates the first learning model by machine-learning the data that has been annotated with labels by the first annotation unit 306 (for example, OK particle images and NG particle images), and the initially-unclassifiable data added in S22, in the particle image storage unit 304, as training data.

Figure 9:
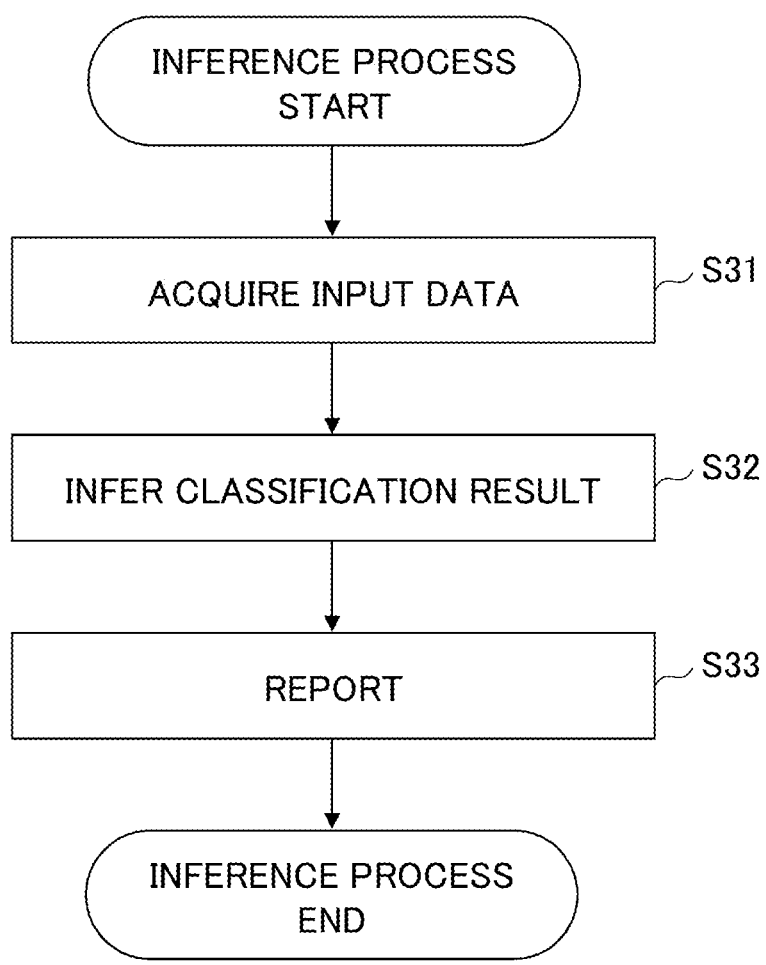
FIG. 9 is a flowchart that illustrates a data classification result inference process flow according to an embodiment of the present invention.

FIG. 9 is a flowchart that illustrates the flow of the data classification result inference process according to an embodiment of the present invention.

In step 31 (S31), the first classification unit 305 acquires input data (for example, particle images).

In step 32 (S32), the first classification unit 305 classifies the data acquired in S31 into classifiable data (for example, OK particle images, NG particle images, etc.) and initially-unclassifiable data, based on the first learning model in the first learning model storage unit 308.

In step 33 (S33), the first classification unit 305 reports the classification result inferred in S32, to any terminal of choice such as the user terminal 103.

Note that, as explained above, the present invention can be configured to classify data in two steps, based on the first learning model and the second learning model.

<Advantages>

According to the embodiments of the present invention, the machine learning device 102 classifies data into "classifiable data" and "initially-unclassifiable data", and then classifies the "initially-unclassifiable data." Then, the classification result of "initially-unclassifiable data" is corrected by a person. Thus, according to the embodiments of the present invention, two-step classification based on the first learning model and the second learning model is employed, and the classification based on the second learning model is applied only to "initially-unclassifiable data," so that the accuracy of classification of the data, for which the labels to be applied can be determined only with a lower level of accuracy, can be improved.

Note that the present invention is by no means limited to the structures shown herein, including combinations of components disclosed herein. The components disclosed herein and their combinations can be altered without departing from the scope of the present invention, and can be determined as appropriate according to their mode of application.

REFERENCE SIGNS LIST

100 Quality check system
101 Optical microscope
102 Machine learning device
103 User terminal
104 Network
301 Target-object image acquiring unit
302 Target-object image storage unit
303 Particle image clipping unit
304 Particle image storage unit
305 First classification unit
306 First annotation unit
307 First learning model updating unit
308 First learning model storage unit
309 Second classification unit
310 Second annotation unit
311 Second learning model updating unit
312 Second learning model storage unit
313 Label acquiring unit
314 Initially-unclassifiable data storage unit

The invention claimed is:

1. A machine learning device comprising:
a processor that is configured to:
classify data into classifiable data and initially-unclassifiable data based on a first learning model;
annotate the classifiable data with a label;
classify the initially-unclassifiable data based on a second learning model;
acquire a first label with which the initially-unclassifiable data is to be annotated, said first label being acquired based on input data that is input by a user to a user terminal that is connected to the machine learning device via a network;
annotate the initially-unclassifiable data with a second label; and
update the second learning model based on the initially-unclassifiable data that is annotated with the second label based on a result of classification by the processor and the first label acquired by the processor,
wherein the data includes images of particles, and
wherein each of the label, the first label and the second label is one of:
a label indicating that a shape of a particle included in the images of particles satisfies a predetermined criterion; and
a label indicating that the shape of the particle does not satisfy the predetermined criterion, and
wherein the processor is configured to acquire only the first label with which the initially-unclassifiable data identified in the processor is to be annotated, the initially-unclassifiable data having a lower level of confidence of being an OK particle image than a predetermined value, and having a lower level of confidence of being an NG particle image than a predetermined value.

2. The machine learning device according to claim 1, the processor is further configured to update the first learning model based on the initially-unclassifiable data, annotated with the second label based at least on the result of classification by the processor.

3. The machine learning device according to claim 1, wherein each of the label, the first label and the second label is for classifying the data into two classes.

4. The machine learning device according to claim 1,
wherein the data includes images of all particles in a target-object image, and
wherein the processor reports a proportion of OK particle images with respect to an entirety of the images of particles, a proportion of NG particle images with respect to the entirety of the images of particles, and a proportion of the initially-unclassifiable data with respect to the entirety of the images of particles.

5. A method comprising:
classifying data into classifiable data and initially-unclassifiable data based on a first learning model;
annotating the classifiable data with a label;
classifying the initially-unclassifiable data based on a second learning model;
acquiring a first label with which the initially-unclassifiable data is to be annotated, said first label being acquired based on input data that is input by a user to a user terminal that is connected to the machine learning device via a network;
annotating the initially-unclassifiable data with a second label; and
updating the second learning model based on the initially-unclassifiable data that is annotated with the second label based on a result of classification of the initially-unclassifiable data and the first label acquired by acquiring,
wherein the data includes images of particles, and
wherein each of the label, the first label and the second label is one of:
a label indicating that a shape of a particle included in the images of particles satisfies a predetermined criterion; and
a label indicating that the shape of the particle does not satisfy the predetermined criterion, and
wherein the acquiring acquires only the first label with which the initially-unclassifiable data identified in the second classification unit is to be annotated, the initially-unclassifiable data having a lower level of confidence of being an OK particle image than a predetermined value, and having a lower level of confidence of being an NG particle image than a predetermined value.

6. A non-transitory computer-readable recording medium having computer-readable instructions stored thereon, which when executed, cause a computer to:
classify data into classifiable data and initially-unclassifiable data based on a first learning model;
annotate the classifiable data with a label;
classify the initially-unclassifiable data based on a second learning model;
acquire a first label with which the initially-unclassifiable data is to be annotated, said first label being acquired based on input data that is input by a user to a user terminal that is connected to the machine learning device via a network;
annotate the initially-unclassifiable data with a second label; and
update the second learning model based on the initially-unclassifiable data that is annotated with the second label based on a result of classification by the computer and the first label acquired by the computer,
wherein the data includes images of particles, and
wherein each of the label, the first label and the second label is one of:
a label indicating that a shape of a particle included in the images of particles satisfies a predetermined criterion; and
a label indicating that the shape of the particle does not satisfy the predetermined criterion, and
wherein the acquiring acquires only the first label with which the initially-unclassifiable data identified in the computer is to be annotated, the initially-unclassifiable data having a lower level of confidence of being an OK particle image than a predetermined value, and having a lower level of confidence of being an NG particle image than a predetermined value.

7. A system comprising a machine learning device and a user terminal, the system comprising:
a processor that is configured to:
classify data into classifiable data and initially-unclassifiable data based on a first learning model;
annotate the classifiable data with a label;
classify the initially-unclassifiable data based on a second learning model;
acquire a first label with which the initially-unclassifiable data is to be annotated, said first label being acquired based on input data that is input by a user to a user terminal that is connected to the machine learning device via a network;
annotate the initially-unclassifiable data with a second label; and
update the second learning model based on the initially-unclassifiable data that is annotated with the second label based on a result of classification by the processor and the first label acquired by the processor,
wherein the data includes images of particles, and
wherein each of the label, the first label and the second label is one of:
a label indicating that a shape of a particle included in the images of particles satisfies a predetermined criterion; and
a label indicating that the shape of the particle does not satisfy the predetermined criterion, and
wherein the processor is configured to acquire only the first label with which the initially-unclassifiable data identified in the processor is to be annotated, the initially-unclassifiable data having a lower level of confidence of being an OK particle image than a predetermined value, and having a lower level of confidence of being an NG particle image than a predetermined value.

* * * * *